(12) United States Patent
Schaumberger et al.

(10) Patent No.: US 9,644,527 B2
(45) Date of Patent: May 9, 2017

(54) METHOD OF OPERATING A COMBUSTION ENGINE PROVIDED WITH AT LEAST ONE FLUSHED PRECHAMBER

(71) Applicant: GE Jenbacher GmbH & Co OG, Jenbach (AT)

(72) Inventors: Herbert Schaumberger, Muenster (AT); Hubert Winter, Graz (AT); Wolfgang Fimml, Jenbach (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 791 days.

(21) Appl. No.: 13/771,540

(22) Filed: Feb. 20, 2013

(65) Prior Publication Data

US 2013/0213347 A1    Aug. 22, 2013

(30) Foreign Application Priority Data

Feb. 21, 2012 (AT) .................................. A 217/2012

(51) Int. Cl.
| | | |
|---|---|---|
| *F02B 17/00* | (2006.01) | |
| *F02B 19/12* | (2006.01) | |
| *F02M 25/03* | (2006.01) | |

(52) U.S. Cl.
CPC ............ *F02B 17/005* (2013.01); *F02B 19/12* (2013.01); *F02M 25/03* (2013.01); *Y02T 10/121* (2013.01); *Y02T 10/125* (2013.01)

(58) Field of Classification Search
CPC .......... F02B 19/14; F02B 19/00; F02B 19/12; F02B 23/04; F02B 2019/006; F02B 19/1009; F02B 19/16; F02B 19/1014; F02B 19/08; F02B 19/02; F02B 17/005; F02M 25/03
USPC ....... 123/253, 254, 255, 256, 257, 258, 259, 123/260, 261, 262, 263, 264, 265, 266, 123/267, 268, 269, 270, 271, 272, 273, 123/274, 275, 276, 277, 278, 279, 280,
(Continued)

(56) References Cited

U.S. PATENT DOCUMENTS 5,012,772 A * 5/1991 Nakamura .............. F02B 47/00
                                                  123/25 C
5,163,385 A * 11/1992 McMillian .............. F02B 19/14
                                                  123/23
(Continued)

FOREIGN PATENT DOCUMENTS

| JP | 6-229318 | 8/1994 |
|---|---|---|
| JP | 8-296441 | 11/1996 |

(Continued)

*Primary Examiner* — Sizo Vilakazi
(74) *Attorney, Agent, or Firm* — Wenderoth, Lind & Ponack, L.L.P.

(57) ABSTRACT

A method of operating a combustion engine provided with at least one flushed prechamber, and the at least one prechamber is connected to a main combustion chamber of the combustion engine. During a compression phase immediately preceding the ignition in the main combustion chamber—after ignition has taken place in the prechamber, in a first transfer phase, gas transfers from the prechamber into the main combustion chamber. After the first transfer phase, an at least two-phase, incompressible medium—preferably water—is introduced into the prechamber.

17 Claims, 2 Drawing Sheets

(58) Field of Classification Search
USPC ....... 123/281, 282, 283, 284, 285, 286, 287, 123/288, 289, 290, 291, 292, 293
See application file for complete search history.

(56) References Cited

U.S. PATENT DOCUMENTS

| | | | | |
|---|---|---|---|---|
| 6,119,650 A | * | 9/2000 | Tanigawa | ................ F02B 19/04 123/268 |
| 2007/0272200 A1 | * | 11/2007 | Kamimura | .............. F02B 19/04 123/261 |
| 2009/0188467 A1 | * | 7/2009 | Loggers | ................. F02B 47/02 123/25 C |

FOREIGN PATENT DOCUMENTS

| | | |
|---|---|---|
| JP | 2001-164955 | 6/2001 |
| JP | 2004-251194 | 9/2004 |
| JP | 2007-127453 | 5/2007 |

\* cited by examiner

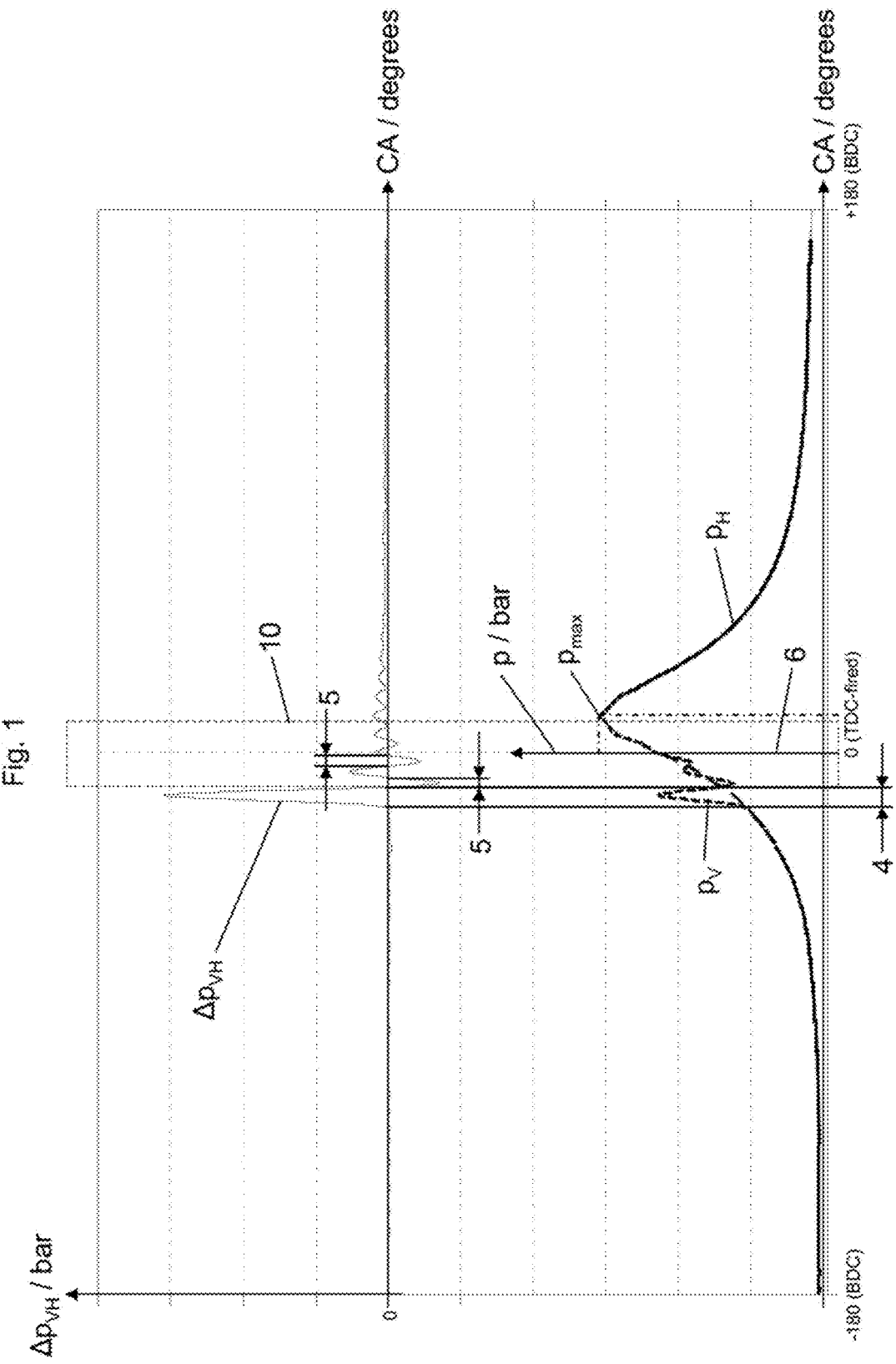

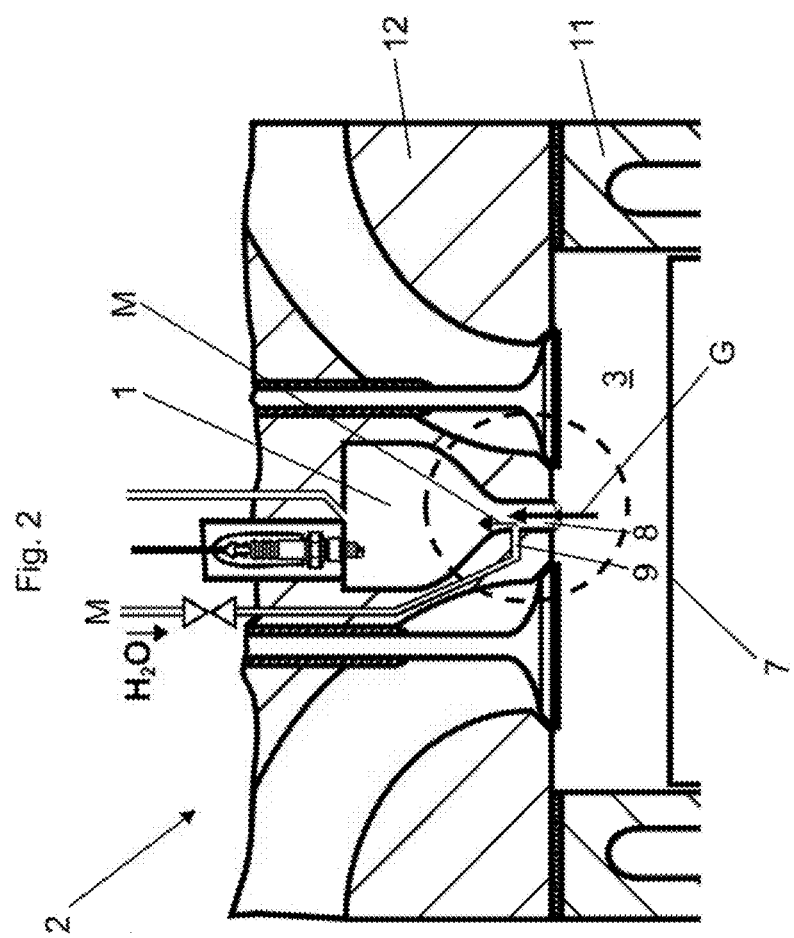
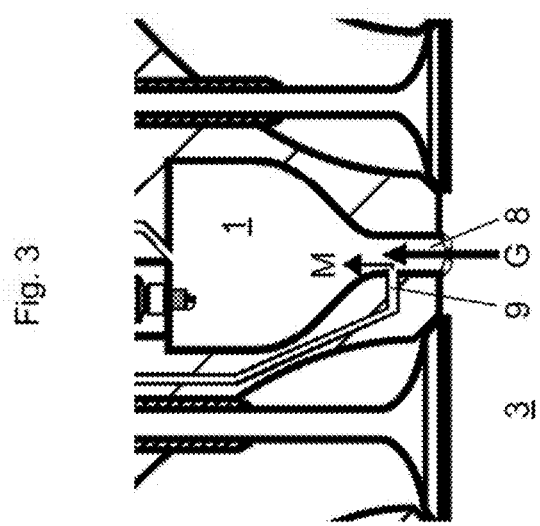

METHOD OF OPERATING A COMBUSTION ENGINE PROVIDED WITH AT LEAST ONE FLUSHED PRECHAMBER

BACKGROUND OF THE INVENTION

The invention relates to a method of operating a combustion engine provided with at least one flushed prechamber. The at least one prechamber is connected to a main combustion chamber of the combustion engine. During a compression phase immediately preceding the ignition in the main combustion chamber—after ignition has taken place in the prechamber, in a first transfer phase, gas transfers from the prechamber into the main combustion chamber.

In Otto-cycle operated combustion engines, in particular in gas engines, in which a fuel-air mixture is ignited, for larger combustion chamber volumes the lean concept is applied. This means that a relatively large air excess is present, so that at maximum power density and simultaneously high efficiency of the engine, the harmful emissions and the thermal loading of the components are minimized. The ignition and combustion of very lean fuel-air mixtures represent a considerable challenge for the development and/or operation of modern high-performance gas engines.

Starting from a certain size of gas engines (generally with displacement above about six liters) it is necessary to use ignition intensifiers, in order to pass through the correspondingly large flame paths in the combustion chambers of the cylinders in the shortest possible time. Prechambers usually serve as these ignition intensifiers, and the fuel-air mixture that is highly compressed at the end of the compression stroke is ignited in a relatively small secondary space separate from the main combustion chamber of the cylinders. In this case, a main combustion chamber is delimited by the working piston, the cylinder liner, and the bottom of the cylinder head. The secondary space (the prechamber) is connected via one or a plurality of transfer holes with the main combustion chamber. Often these prechambers are flushed or filled with fuel gas during the gas exchange phase, in order to enrich the fuel-air mixture and thus improve the ignition and combustion properties. For this, a small amount of fuel gas is diverted from the fuel supply line to the main combustion chamber and fed into the prechamber via a suitable feed device provided with a nonreturn valve. This amount of fuel gas flushes the prechamber during gas exchange and so is often known as flushing gas.

During the compression phase, the very lean fuel-air mixture of the main combustion chamber flows through the transfer holes into the prechamber, where it mixes with the flushing gas. The ratio of fuel to air in the mixture is stated as the excess-air coefficient $\lambda$. An excess-air coefficient of $\lambda=1$ means that the amount of air present in the mixture corresponds exactly to the amount that is required to allow complete combustion of that amount of fuel. In such a case, combustion takes place stoichiometrically. At full load, large gas engines are usually run lean, at $\lambda$ of approx. 1.9 to 2.0, i.e. the amount of air in the mixture corresponds to about twice the stoichiometric amount of air. Due to the flushing of the prechamber with fuel gas, after mixing with the fuel gas-air mixture of the main combustion chamber, an average $\lambda$ in the prechamber is approx. 0.8 to 0.9. Therefore, the ignition conditions are optimal and, due to the energy density, there are intensive ignition flames extending into the main combustion chamber, which lead to a rapid, thorough combustion of the fuel-air mixture in the main combustion chamber. At these $\lambda$ values, however, combustion takes place at the maximum temperature level, so that the wall temperatures in the region of the prechamber are also correspondingly high. As a result, on the one hand there is correspondingly high thermal loading of the prechamber and of the components arranged therein (e.g. spark plug, valves) and on the other hand there are undesirably high nitrogen oxide emissions.

Injecting water into a prechamber, so that the associated drop in temperature reduces the nitrogen oxide emissions, is already known from JP 07-127453.

This has the drawback that the water is injected into the prechamber before or during ignition, thus reducing the performance of the prechamber as ignition intensifier.

SUMMARY OF THE INVENTION

The object to be achieved by the invention is to provide an improved method of operating a combustion engine, in which the nitrogen oxides formed in the prechamber and by the prechamber are reduced. Furthermore, the performance of the prechamber as ignition intensifier should not be reduced.

This object is achieved according to the invention in that, after the first transfer phase, an at least two-phase, incompressible medium—preferably water—is introduced into the prechamber.

As the formation of nitrogen oxides to a large extent takes place after the actual combustion, one aim of the invention is to lower the temperature of the burnt gas. Therefore, after the ignition in the prechamber and optionally even before the ignition in the main combustion chamber in the same combustion cycle, an at least two-phase medium, preferably in its liquid state, is introduced into the prechamber.

The medium is preferably water, which is injected into the prechamber. Through the evaporation of the medium or of the water in the prechamber, the contents of the prechamber are cooled, so that there is less formation of nitrogen oxides.

Because the medium is not introduced into the prechamber until after the first transfer phase, the performance of the prechamber as ignition intensifier is not impaired, i.e. the ignition in the prechamber as well as in the main combustion chamber can take place at the conventional high temperatures and thus also with the conventional ignition energy. Because the medium is not introduced into the prechamber until after ignition, furthermore only relatively small amounts of the medium are necessary to achieve a corresponding cooling and therefore a corresponding reduction of nitrogen oxide emissions.

According to a preferred embodiment variant, the medium is introduced into the prechamber before the maximum pressure can be reached in the main combustion chamber. The maximum pressure in the main combustion chamber is reached after a piston delimiting the main combustion chamber passes the top dead center. Due to the prevailing pressure conditions in the prechamber and in the main combustion chamber during the time window between the first transfer phase and attainment of maximum pressure in the main combustion chamber, it is particularly advantageous for the medium to be introduced into the prechamber in this time window. During this time window, the compression by the cylinder in the main combustion chamber means that at least for a time, backflowing gas is forced from the main combustion chamber into the prechamber. Thus, it is particularly favorable if in at least one second transfer phase, backflowing gas from the main combustion chamber flows back into the prechamber, wherein the medium is introduced at least for a time during the at least one second transfer phase.

In an advantageous design configuration, the prechamber can be connected to the main combustion chamber via a transfer channel, wherein the medium is introduced via at least one injection channel that opens into the overflow channel. In this way, the prevailing pressure conditions are automatically utilized advantageously, and in every other transfer phase during introduction of the medium, this is forced automatically into the prechamber.

Combustion processes in a combustion engine are often controlled as a function of the crankshaft position or as a function of the crankshaft angle. Accordingly, in an advantageous configuration of the proposed method, the medium can be introduced in a range of crankshaft angle from about 15 degrees of crankshaft angle before a top dead center of a piston delimiting the main combustion chamber to about 10 degrees of crankshaft angle after the top dead center of the piston delimiting the main combustion chamber.

According to a particularly preferred embodiment, the medium can be introduced at a pressure of at least 100 bar, preferably about 200 bar. At high loads, cylinder pressures from about 30 bar to 70 bar may prevail in the combustion chambers (main combustion chamber and prechamber). A correspondingly high injection pressure can ensure that the medium can be introduced into the prechamber despite these high cylinder pressures.

BRIEF DESCRIPTION OF THE DRAWINGS

Further details and advantages of the present invention are explained on the basis of the following figures, which show:

FIG. 1 pressure variations in prechamber and main combustion chamber of a combustion engine as a function of the crankshaft angle in the region of the top dead center of a piston delimiting the main combustion chamber, FIG. 2 a prechamber with a proposed water injection system and FIG. 3 an enlarged representation of a detail of FIG. 2.

DETAILED DESCRIPTION OF THE INVENTION

FIG. 1 shows two diagrams. The upper diagram shows the variation of a differential pressure $\Delta p_{VH}$ as a function of the crankshaft angle CA. The differential pressure $\Delta p_{VH}$ is to be regarded as the difference between the pressure $p_V$ in the prechamber and the pressure $p_H$ in the main combustion chamber. The range of crankshaft angle CA shown extends over a complete compression cycle and a complete expansion cycle of an Otto-cycle operated external ignition gas engine, beginning at the bottom dead center BDC of a piston 7 delimiting the main combustion chamber 3 (−180 degrees of crankshaft angle CA) and ending at the bottom dead center BDC of the piston 7 (+180 degrees of crankshaft angle CA). The top dead center 6 (TDC) of the piston 7 delimiting the main combustion chamber 3 (0 degrees of crankshaft angle CA) is also shown with dashed lines.

The lower diagram in FIG. 1 shows the absolute pressure variations of the pressure $p_V$ in the prechamber and of the pressure $p_H$ in the main combustion chamber. In the region marked with the reference symbol 4 (first transfer phase 4) the ignition takes place in the prechamber 1 (e.g. by an ignition spark of a spark plug), so that the increase in pressure $p_V$ in the prechamber 1 because of the expanding gas is greater than the increase in pressure $p_H$ in the main combustion chamber 3 due to the compression by piston 7. As can be seen from the variation of differential pressure $\Delta p_{VH}$, in this range of the crankshaft angle 4 (first transfer phase 4) there is an overpressure in the prechamber 1 relative to the main combustion chamber 3. As a result, the ignited fuel-air mixture and the resultant ignition flames are forced from the prechamber 1 through one or a plurality of transfer channels 8 into the main combustion chamber 3 (see FIG. 2).

In the proposed method, after this first transfer phase 4, an at least two-phase, incompressible medium M—preferably water—is now introduced into the prechamber 1, to cool the contents of the prechamber 1 and accordingly reduce the formation of nitrogen oxides. Due to the prevailing pressure conditions $p_V$, $p_H$ in the prechamber 1 and in the main combustion chamber 3, after the first transfer phase 4 one or more second overflow phases 5 forms or form, during which backflowing gas G is forced back from the main combustion chamber 3 into the prechamber 1. These second overflow phases 5 are suitable in particular for introducing the medium M or the water into the prechamber 1, because in these second overflow phases 5 the flow of the backflowing gas G is toward the prechamber 1. At the latest after reaching the maximum pressure $p_{max}$ in the main combustion chamber 3, the pressure conditions $p_V$, $p_H$ are, however, such that there is no longer any backflow into the prechamber 1.

Therefore, the most favorable region for introducing the medium M or the water into the prechamber 1 is after the end of the first transfer phase 4 and before reaching the maximum pressure $p_{max}$ in the main combustion chamber 3. This favorable injection region is marked in FIG. 1 with a dashed rectangle and has the reference symbol 10.

It should be pointed out that the diagrams shown in FIG. 1 show the corresponding pressure variations without the proposed introduction of an at least two-phase medium M into the prechamber 1. If, according to the proposed method, a medium M or water is introduced or injected in a second transfer phase 5, owing to the evaporation of the medium M in the prechamber 1 and the associated cooling of the contents of the prechamber, the pressure $p_V$ in the prechamber 1 decreases, so that an additional pressure gradient develops in the direction of the prechamber 1. The resultant pressure conditions $p_V$, $p_H$ thus additionally favor the introduction of the medium M into the prechamber 1.

FIG. 2 shows a prechamber 1 of a combustion engine 2. In this example, the prechamber 1 is connected via a transfer channel 8 to a main combustion chamber 3 of the combustion engine 2, so that overall a continuous volume is formed, comprising the prechamber volume and the main combustion chamber volume without a valve arranged therebetween. The main combustion chamber 3 is delimited in this representation laterally by a cylinder liner 11, from above by the bottom of a cylinder head 12 and from below by the end face of the piston 7. An injection channel 9, through which a medium M—preferably water—can, according to the proposed method, be introduced or injected into the prechamber 1, opens into the transfer channel 8. This injection channel 9 can in addition also generally be regarded as a cooling channel for the prechamber 1.

FIG. 3 shows an enlarged representation of the region marked with a circle in FIG. 2. In this representation, the prechamber 1 of the combustion engine 2 is in a second transfer phase 5 (see FIG. 1). In this case, due to the prevailing pressure conditions $p_V$, $p_H$ in the prechamber 1 and in the main combustion chamber 3, backflowing gas G is forced from the main combustion chamber 3 into the prechamber 1. During this second transfer phase 5, favorably the medium M or water is introduced via the injection channel 9 into the transfer channel 8, after which it then goes into the prechamber 1, where it can lead to cooling of the contents of the prechamber. Preferably, the medium M or the water is injected at a pressure of at least 100 bar, preferably about 200 bar. Generally, per combustion cycle and prechamber 1, about 2 mm$^3$ to about 5 mm$^3$ of medium M or water can be introduced.

At the point where the injection channel 9 opens into the transfer channel 8, a nonreturn valve can also be arranged, which for example does not open until there is a pressure difference of about 10 bar to 20 bar between the pressure in the injection channel 9 and the pressure in the transfer channel 8, for introducing the medium M or the water into the transfer channel 8. A nozzle, through which the medium M or the water can be injected into the transfer channel 8, can be arranged where the injection channel 9 opens into the overflow channel 8. By introducing the medium M or the water into the transfer channel 8, additionally the introduction of burnt gases from the main combustion chamber 3 into the prechamber 1 can be reduced. Through the evaporation of the medium M, an evaporation cushion can form in the transfer channel 8, which acts as a barrier against the backflowing gas from the main combustion chamber 3. This leads to a further reduction in nitrogen oxide formation.

The invention claimed is:

1. A method of operating a combustion engine having at least one flushed prechamber connected to a main combustion chamber of the combustion engine, the prechamber being connected to the main combustion chamber via a transfer channel, said method comprising:
    after ignition has taken place in the prechamber and during a compression phase immediately preceding ignition in the main combustion chamber, transferring gas from the prechamber into the main combustion chamber in a first transfer phase; and
    after the first transfer phase, introducing an at least two-phase incompressible medium into the transfer channel between the prechamber and the main combustion chamber via at least one injection channel opening into the transfer channel.

2. The method according to claim 1, wherein the medium is water.

3. The method according to claim 1, wherein backflowing gas flows back from the main combustion chamber into the prechamber in at least one second transfer phase, further comprising introducing the medium for a period of time during the at least one second transfer phase.

4. The method according to claim 1, wherein said introducing the medium comprises introducing the medium during a period of time when a crankshaft is in a range of crankshaft angle from about 15 degrees of crankshaft angle before a top dead center of a piston delimiting the main combustion chamber to about 10 degrees of crankshaft angle after the top dead center of the piston delimiting the main combustion chamber.

5. The method according to claim 1, wherein the medium is introduced at a pressure of at least 100 bar.

6. The method according to claim 5, wherein the medium is introduced at a pressure of about 200 bar.

7. A method of operating a combustion engine having at least one flushed prechamber connected to a main combustion chamber of the combustion engine, the prechamber being connected to the main combustion chamber via a transfer channel, said method comprising:
    after ignition has taken place in the prechamber and during a compression phase immediately preceding ignition in the main combustion chamber, transferring gas from the prechamber into the main combustion chamber in a first transfer phase; and
    after the first transfer phase, introducing an at least two-phase, incompressible medium into the prechamber at a pressure of at least 100 bar, said introducing the medium comprising introducing the medium into the prechamber before a maximum pressure $p_{max}$ is reached in the main combustion chamber.

8. The method according to claim 7, wherein the medium is water.

9. The method according to claim 7, wherein said introducing the medium comprises injecting the medium into the prechamber.

10. The method according to claim 7, wherein backflowing gas flows back from the main combustion chamber into the prechamber in at least one second transfer phase, further comprising introducing the medium for a period of time during the at least one second transfer phase.

11. The method according to claim 7, wherein said introducing the medium comprises introducing the medium during a period of time when a crankshaft is in a range of crankshaft angle from about 15 degrees of crankshaft angle before a top dead center of a piston delimiting the main combustion chamber to about 10 degrees of crankshaft angle after the top dead center of the piston delimiting the main combustion chamber.

12. The method according to claim 7, wherein said introducing the medium comprises introducing the medium at a pressure of about 200 bar.

13. A method of operating a combustion engine having at least one flushed prechamber connected to a main combustion chamber of the combustion engine, the prechamber being connected to the main combustion chamber via a transfer channel, said method comprising:
    after ignition has taken place in the prechamber and during a compression phase immediately preceding ignition in the main combustion chamber, transferring gas from the prechamber into the main combustion chamber in a first transfer phase; and
    after the first transfer phase, introducing an at least two-phase, incompressible medium into the prechamber at a pressure of at least 100 bar;
    wherein backflowing gas flows back from the main combustion chamber into the prechamber in at least one second transfer phase, further comprising introducing the medium for a period of time during the at least one second transfer phase.

14. The method according to claim 13, wherein the medium is water.

15. The method according to claim 13, wherein said introducing the medium comprises injecting the medium into the prechamber.

16. The method according to claim 13, wherein said introducing the medium comprises introducing the medium during a period of time when a crankshaft is in a range of crankshaft angle from about 15 degrees of crankshaft angle before a top dead center of a piston delimiting the main combustion chamber to about 10 degrees of crankshaft angle after the top dead center of the piston delimiting the main combustion chamber.

17. The method according to claim 13, wherein said introducing the medium comprises introducing the medium at a pressure of about 200 bar.

* * * * *